United States Patent
Lei (10) Patent No.: US 12,328,723 B2
(45) Date of Patent: Jun. 10, 2025

(54) METHOD AND APPARATUS FOR HARQ-ACK SUB-CODEBOOK COMBINATION

(71) Applicant: Lenovo (Beijing) Ltd., Beijing (CN)

(72) Inventor: Haipeng Lei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 415 days.

(21) Appl. No.: 17/916,882

(22) PCT Filed: Apr. 10, 2020

(86) PCT No.: PCT/CN2020/084228
§ 371 (c)(1),
(2) Date: Oct. 4, 2022

(87) PCT Pub. No.: WO2021/203420
PCT Pub. Date: Oct. 14, 2021

(65) Prior Publication Data
US 2023/0156701 A1 May 18, 2023

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 72/23* (2023.01)

(58) Field of Classification Search
CPC .............. H04W 72/1273; H04W 72/23; H04L 1/1812; H04L 5/0053; H04L 5/0055;
(Continued)

(56) References Cited

U.S. PATENT DOCUMENTS

| 12,262,377 B2 * | 3/2025 | Liang | H04W 72/20 |
| 2019/0379489 A1 * | 12/2019 | Hwang | H04L 1/0063 |

(Continued)

FOREIGN PATENT DOCUMENTS

| WO | 2019218357 A1 | 11/2019 |
| WO | 2020029696 A1 | 2/2020 |
| WO | 2020069468 A1 | 4/2020 |

OTHER PUBLICATIONS

PCT/CN2020/084228, "International Preliminary Report on Patentability", PCT Application No. PCT/CN2020/084228, Oct. 20, 2022, 6 pages.

(Continued)

*Primary Examiner* — Yu-Wen Chang
(74) *Attorney, Agent, or Firm* — FIG. 1 Patents (57) ABSTRACT

Embodiments of the present application are related to a method and apparatus for hybrid automatic repeat request acknowledgement (HARQ-ACK) sub-codebook combination under 3GPP (3rd Generation Partnership Project) 5G new radio (NR). A method for wireless communications performed by a user equipment (UE) includes: receiving a downlink control information (DCI) format for scheduling a physical downlink shared channel (PDSCH) transmission in a PDSCH group, wherein the DCI format includes an indicator for requesting that hybrid automatic repeat request acknowledgement (HARQ-ACK) feedback corresponding to the PDSCH group and HARQ-ACK feedback corresponding to another PDSCH group are to be transmitted in same HARQ-ACK codebook, and the PDSCH transmission is a last PDSCH transmission in the PDSCH group received by the UE before transmission of the HARQ-ACK feedback corresponding to the PDSCH group; and transmitting a HARQ-ACK codebook, wherein the HARQ-ACK codebook includes at least two parts, one part comprises HARQ-ACK information bits for the PDSCH group, and the other (Continued)

pad comprises HARQ-ACK information bits for the above mentioned another PDSCH group.

20 Claims, 6 Drawing Sheets

(51) Int. Cl.
  *H04L 5/00* (2006.01)
  *H04W 72/23* (2023.01)
(58) Field of Classification Search
  CPC ... H04L 1/1671; H04L 1/1614; H04L 5/0091; H04L 1/1861; H04L 1/1896
  See application file for complete search history.

(56) References Cited

U.S. PATENT DOCUMENTS

| 2020/0225174 | A1* | 7/2020 | Tal | C23C 16/484 |
| 2022/0021505 | A1* | 1/2022 | Ma | H04L 5/0044 |
| 2022/0201724 | A1* | 6/2022 | Zhang | H04W 72/0446 |
| 2022/0256586 | A1* | 8/2022 | Zeng | H04L 1/1812 |
| 2022/0407632 | A1* | 12/2022 | Khoshnevisan | H04L 1/1861 |

OTHER PUBLICATIONS

PCT/CN2020/084228, "International Search Report and Written Opinion", PCT Application No. PCT/CN2020/084228, Dec. 30, 2020, 7 pages.

Qualcomm, "TP for Enhancements to Scheduling and HARQ operation for NR-U", 3GPP TSG Ran WG1 Meeting #100e, R1-2000958 [retrieved Sep. 19, 2022]. Retrieved from the Internet <https://www.3gpp.org/ftp/tsg_ran/WG1_RL1/TSGR1_100_e/Docs>., Feb. 2020, 6 Pages.

Vivo, "Remaining issues on HARQ operation for NR-U", 3GPP TSG RAN WG1#100, R1-2000311, e-Meeting [retrieved Sep. 19, 2022]. Retrieved from the Internet <https://www.3gpp.org/ftp/tsg_ran/WG1_RL1/TSGR1_100_e/Docs>., Feb. 2020, 18 Pages.

Wilus Inc., "Discussion on HARQ-ACK multiplexing and bundling for NR", 3GPP TSG RAN WG1 Meeting 91, R1-1720876, Reno, USA [retrieved Sep. 19, 2022]. Retrieved from the Internet <https://www.3gpp.org/ftp/tsg_ran/WG1_RL1/TSGR1_91/Docs/?sortby=sizerev>., Nov. 2017, 6 Pages.

* cited by examiner

|    | S0 | S1 | S2 | S3 | S4 | S5 | S6 | S7 | S8 | S9 | S10 |
|----|----|----|----|----|----|----|----|----|----|----|-----|
| Case 1 | 1 | a0 | a1 | a2 | b0 | b1 | b2 | | | | |

FIG. 4A

|    | S0 | S1 | S2 | S3 | S4 | S5 | S6 | S7 | S8 | S9 | S10 |
|----|----|----|----|----|----|----|----|----|----|----|-----|
| Case 2 | 0 | a0 | a1 | b0 | b1 | b2 | | | | | |

FIG. 4B

|    | S0 | S1 | S2 | S3 | S4 | S5 | S6 | S7 | S8 | S9 | S10 |
|----|----|----|----|----|----|----|----|----|----|----|-----|
| Case 1 | a0 | a1 | a2 | b0 | b1 | b2 | NACK | NACK | NACK | NACK | 1 |

FIG. 4C

|    | S0 | S1 | S2 | S3 | S4 | S5 | S6 | S7 | S8 | S9 | S10 |
|----|----|----|----|----|----|----|----|----|----|----|-----|
| Case 2 | a0 | a1 | b0 | b1 | b2 | NACK | NACK | NACK | NACK | NACK | 0 |

FIG. 4D

|    | S0 | S1 | S2 | S3 | S4 | S5 | S6 | S7 | S8 | S9 | S10 |
|----|----|----|----|----|----|----|----|----|----|----|-----|
| Case 1 | 1 | 1 | a0 | a1 | a2 | b0 | b1 | b2 | | | |

FIG. 4E

|    | S0 | S1 | S2 | S3 | S4 | S5 | S6 | S7 | S8 | S9 | S10 |
|----|----|----|----|----|----|----|----|----|----|----|-----|
| Case 2 | 0 | 1 | a0 | a1 | b0 | b1 | b2 | | | | |

| | S0 | S1 | S2 | S3 | S4 | S5 | S6 | S7 | S8 | S9 | S10 |
|---|---|---|---|---|---|---|---|---|---|---|---|
| Case 1 | a0 | b0 | a1 | b1 | a2 | b2 | NACK | NACK | NACK | NACK | NACK |

FIG. 6A

| | S0 | S1 | S2 | S3 | S4 | S5 | S6 | S7 | S8 | S9 | S10 |
|---|---|---|---|---|---|---|---|---|---|---|---|
| Case 2 | a0 | b0 | a1 | b1 | NACK | b2 | NACK | NACK | NACK | NACK | NACK |

FIG. 6B

| | S0 | S1 | S2 | S3 | S4 | S5 | S6 | S7 | S8 | S9 | S10 |
|---|---|---|---|---|---|---|---|---|---|---|---|
| Case 1 | a0 | a1 | a2 | NACK | NACK | NACK | b0 | b1 | b2 | NACK | NACK |

FIG. 7A

| | S0 | S1 | S2 | S3 | S4 | S5 | S6 | S7 | S8 | S9 | S10 |
|---|---|---|---|---|---|---|---|---|---|---|---|
| Case 2 | a0 | a1 | NACK | NACK | NACK | NACK | b0 | b1 | b2 | NACK | NACK |

METHOD AND APPARATUS FOR HARQ-ACK SUB-CODEBOOK COMBINATION

TECHNICAL FIELD

Embodiments of the present application generally relate to wireless communication technology, especially to a method and an apparatus for hybrid automatic repeat request acknowledgement (HARQ-ACK) sub-codebook combination under 3GPP (3rd Generation Partnership Project) 5G new radio (NR).

BACKGROUND

With network developments of 3GPP 5G NR, various aspects need to be studied and developed to perfect the 3GPP 5G NR. In 3GPP Release 16 the new radio (NR) access on unlicensed spectrum (NR-U), enhanced dynamic HARQ-ACK codebook is specified with a new concept of PDSCH grouping. Currently, details regarding determining HARQ enhancement for NR-U with the concept of PDSCH grouping have not been discussed in 3GPP 5G NR technology yet.

SUMMARY

Some embodiments of the present application provide a method for wireless communications performed by a user equipment (UE). The method includes: receiving a downlink control information (DCI) format for scheduling a physical downlink shared channel (PDSCH) transmission in a PDSCH group, wherein the DCI format includes an indicator for requesting that hybrid automatic repeat request acknowledgement (HARQ-ACK) feedback corresponding to the PDSCH group and HARQ-ACK feedback corresponding to another PDSCH group are to be transmitted in same HARQ-ACK codebook, and the PDSCH transmission is a last PDSCH transmission in the PDSCH group received by the UE before transmission of the HARQ-ACK feedback corresponding to the PDSCH group; and transmitting a HARQ-ACK codebook, wherein the HARQ-ACK codebook includes at least two parts, one part includes HARQ-ACK information bits for the PDSCH group, and the other part includes HARQ-ACK information bits for the above-mentioned another PDSCH group.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communications performed by a UE.

Some embodiments of the present application provide a method for wireless communications performed by a base station (BS). The method includes: transmitting, to a UE, a DCI format for scheduling a PDSCH in a PDSCH group, wherein the DCI format includes an indicator for requesting that HARQ-ACK feedback corresponding to the PDSCH group and HARQ-ACK feedback corresponding to another PDSCH group are to be transmitted in same HARQ-ACK codebook, and the PDSCH transmission is a last PDSCH transmission in the PDSCH group transmitted by the BS before reception of the HARQ-ACK feedback corresponding to the PDSCH group; and receiving, from the UE, a HARQ-ACK codebook, wherein the HARQ-ACK codebook includes at least two parts, one part includes HARQ-ACK information bits for the PDSCH group, and the other part includes HARQ-ACK information bits for the above-mentioned another PDSCH group.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communications performed by a BS.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

Figure 1:
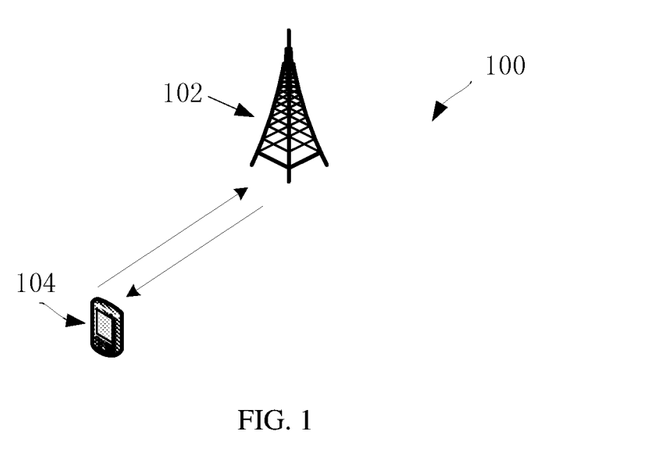
FIG. 1 illustrates a schematic diagram of a wireless communication system 100 in accordance with some embodiments of the present application.

FIG. 1 illustrates a schematic diagram of a wireless communication system 100 in accordance with some embodiments of the present application.

As shown in FIG. 1, the wireless communication system 100 includes a BS 102 and a UE 104. Although merely one BS is illustrated in FIG. 1 for simplicity, it is contemplated that the wireless communication system 100 may include more BSs in some other embodiments of the present disclosure. Similarly, although merely one UE is illustrated in FIG. 1 for simplicity, it is contemplated that the wireless communication system 100 may include more UEs in some other embodiments of the present disclosure.

The BS 102 may also be referred to as an access point, an access terminal, a base, a macro cell, a node-B, an enhanced node B (eNB), a gNB, a home node-B, a relay node, or a device, or described using other terminology used in the art. The BS 102 is generally part of a radio access network that may include a controller communicably coupled to the BS 102.

The UE 104 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE 104 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 104 may include wearable devices, such as smart watches, fitness bands, optical head-mounted displays, or the like. Moreover, the UE 104 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The UE 104 may communicate with the BS 102 to receive data packets from the BS 102 on downlink (DL) and/or transmit data packets to the BS 102 on uplink (UL). The UE 104 may activate multiple panels for communications between the UE 104 and the BS 102, and report the panel status to the BS 102 by higher layer signaling such as radio resource control (RRC) signaling or medium access control (MAC) control element (CE) signaling.

In 3GPP NR Release 16, enhanced dynamic HARQ-ACK codebook is specified with a new concept of PDSCH grouping. Specifically, PDSCH grouping mechanism, the maximum number of PDSCH groups is fixed to 2, which is not configured by RRC signaling. A PDSCH group index is explicitly indicated in downlink control information (DCI), which is for scheduling a PDSCH transmission in a PDSCH group with the PDSCH group index. DCI may be referred to as "a DCI format." One-bit indicator named "number of requested PDSCH group(s)" is included in DCI for scheduling a PDSCH transmission in a PDSCH group, and it may be simplified as "RI". Bit "0" of RI indicates that HARQ-ACK feedback only for the PDSCH group indicated by the PDSCH group index is requested, and bit "1" of RI indicates that HARQ-ACK feedback for both PDSCH groups is requested.

In addition, HARQ-ACK feedback for all PDSCH transmissions in the same PDSCH group is carried in the same PUCCH transmission. One DCI can request HARQ-ACK feedback for one or two PDSCH groups in the same PUCCH transmission. When HARQ-ACK feedback for two PDSCH groups exist in one HARQ-ACK codebook, the placement of HARQ-ACK feedback for the two PDSCH groups may be ordered based on an increasing order of group indexes of the PDSCH groups. Meanwhile, new feedback indicator (NFI) and total downlink assignment index (T-DAI) may be indicated in non-fallback DCI for the non-scheduled group (e.g., the PDSCH group with its PDSCH group index not indicated by the non-fallback DCI) with single or multiple configured DL cells. Existence of NFI and T-DAI in non-fallback DCI can be configured by RRC signaling.

As mentioned above, when HARQ-ACK feedback for two PDSCH groups is requested, the placement for the HARQ-ACK feedback for the two PDSCH groups may be based on an increasing order of PDSCH group index. In detail, two PDSCH groups may be referred to as "PDSCH group 0" and "PDSCH group 1," respectively. The final HARQ-ACK codebook for two PDSCH groups may be constructed by placing the HARQ-ACK information bits for PDSCH group 0 firstly and then concatenating the HARQ-ACK information bits for PDSCH group 1. However, such construction method may cause an error in the final HARQ-ACK codebook, if the DCI which schedules the last PDSCH transmission in PDSCH group 0 is missed by a UE, i.e., not detected by the UE. Details are described in the embodiments of FIG. 2.

Figure 2:
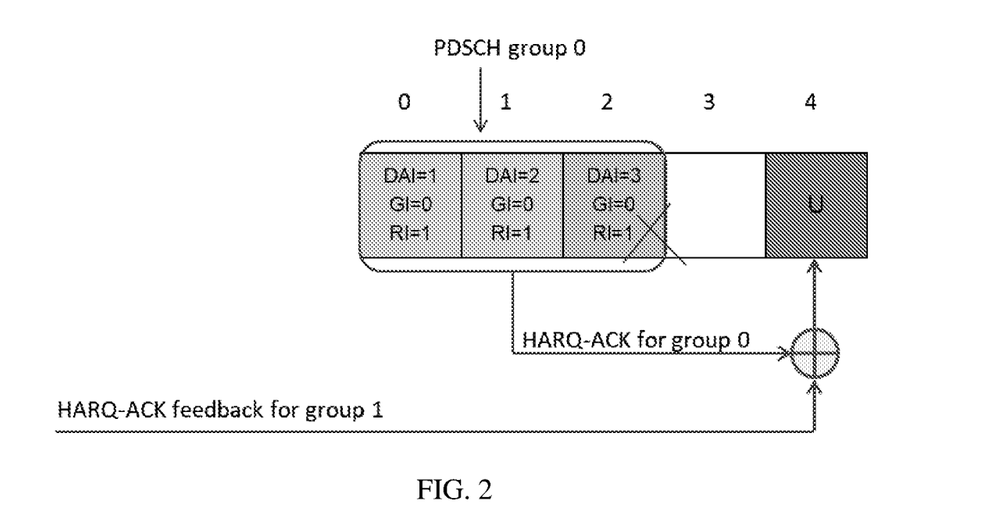
FIG. 2 illustrates an exemplary HARQ-ACK feedback codebook for two PDSCH groups in accordance with some embodiments of the present application.

FIG. 2 illustrates an exemplary HARQ-ACK feedback codebook for two PDSCH groups in accordance with some embodiments of the present application.

Specifically, for example, the embodiments of FIG. 2 assume that transmission of HARQ-ACK feedback for PDSCH group 1 is failed, due to a listen before talk (LBT) failure at a UE side (e.g., UE 104 illustrated and shown in FIG. 1) or incorrectly decoding at a BS side (e.g., BS 102 illustrated and shown in FIG. 1), and the BS requests retransmission of HARQ-ACK feedback for PDSCH group 1 by indicating a value of indicator RI to "1". HARQ-ACK feedback corresponding to PDSCH group 0 is represented as HARQ-ACK for group 0 as shown in FIG. 2. HARQ-ACK feedback corresponding to PDSCH group 1 is represented as HARQ-ACK for group 1 as shown in FIG. 2.

According to the embodiments of FIG. 2, three PDSCH transmissions are included in PDSCH group 0, and the associated PDSCH group index (GI) indicates "0", i.e., PDSCH group 0 as shown in FIG. 2. The BS transmits three DCI formats to schedule three PDSCHs in slots 0, 1 and 2, respectively. Each DCI format includes fields of DAI, GI, and RI, respectively. RI in all DCI formats for slots 0, 1 and 2 indicates bit "1", which indicates that HARQ-ACK feedback for both PDSCH group 0 and PDSCH group 1 is requested in same PUCCH transmission, e.g., in slot 4 as shown in FIG. 2.

In the embodiments of FIG. 2, for instance, a0, a1 and a2 are HARQ-ACK information bits corresponding to PDSCH transmissions in slots 0, 1 and 2, respectively, and b0, b1 and b2 are assumed as retransmitted HARQ-ACK information bits corresponding to PDSCH transmissions in PDSCH group 1. If DCI format scheduling the PDSCH transmission in slot 2 is detected by the UE, the UE will transmit the HARQ-ACK codebook including a0, a1, a2, b0, b1, and b2 to the BS in slot 4. However, if DCI scheduling the PDSCH transmission in slot 2 is missed by the UE, which can't be identified by the UE since it is the last DCI for PDSCH group 0. The UE will transmit a wrong HARQ-ACK codebook, which only includes a0, a1, b0, b1, and b2 but does not include a2, to the BS in slot 4 since UE is not aware of existence of PDSCH transmission in slot 2. That is to say, an error is caused in the final HARQ-ACK codebook due to the last DCI (which schedules the last PDSCH transmission in PDSCH group 0) being missed by a UE.

Given this, at BS side, since HARQ-ACK information bit a2 is not included in the final HARQ-ACK codebook, the BS will misunderstand HARQ-ACK information bit b0 as HARQ-ACK feedback for a PDSCH transmission in slot 2, and will regard HARQ-ACK information bit b1 as the first bit of the retransmitted HARQ-ACK information bits for PDSCH group 1. Thus, the HARQ-ACK information bits for PDSCH group 1 is shifted one bit forward. Such misunderstanding between the UE and the BS renders the BS to retransmit unnecessary PDSCH transmissions, and thus the DL performance between the UE and the BS is degraded.

Since using one DCI format to request HARQ-ACK feedback for two PDSCH groups is one of the main features for enhanced dynamic HARQ-ACK codebook, there is a need to solve the abovementioned issue and provide a solution regarding enhance dynamic HARQ-ACK codebook, to prevent misunderstanding between a BS and a UE on a final HARQ-ACK codebook for two PDSCH groups.

Some embodiments of the present application provide a method for generating a HARQ-ACK codebook for two PDSCH groups. Some embodiments of the present application provide a method for transmitting a HARQ-ACK codebook for two PDSCH groups. Some embodiments of the present application provide a method for determining whether HARQ-ACK feedback corresponding to last PDSCH of one PDSCH group is missed from the HARQ-ACK codebook. Some embodiments of the present application provide a method for adjusting HARQ-ACK feedback for two PDSCH groups, in response to determining that HARQ-ACK feedback corresponding to last PDSCH of one PDSCH group is missed from the HARQ-ACK codebook.

Some embodiments of the present application provide an apparatus for generating a HARQ-ACK codebook for two PDSCH groups. Some embodiments of the present application provide an apparatus for transmitting a HARQ-ACK codebook for two PDSCH groups. Some embodiments of the present application provide an apparatus for determining whether HARQ-ACK feedback corresponding to last PDSCH of one PDSCH group is missed from the HARQ-ACK codebook. Some embodiments of the present application provide an apparatus for adjusting HARQ-ACK feedback for two PDSCH groups, in response to determining that HARQ-ACK feedback corresponding to last PDSCH of one PDSCH group is missed from the HARQ-ACK codebook.

In some embodiments of the present application, when a HARQ-ACK codebook size is not larger than 11 bits, (32, K) Reed-Muller (RM) coding procedure can be used for encoding the HARQ-ACK codebook. Table 5.3.3.3-1 of 3GPP standard document TS38.212 defines 11 basic sequences for (32, K) RM coding procedure, which supports encoding of maximum 11 HARQ-ACK information bits.

In some embodiments of the present application, if a HARQ-ACK codebook size is smaller than 11 bits, NACK bit(s) may be appended as padding bits for (32, K) RM coding procedure.

Figure 3:
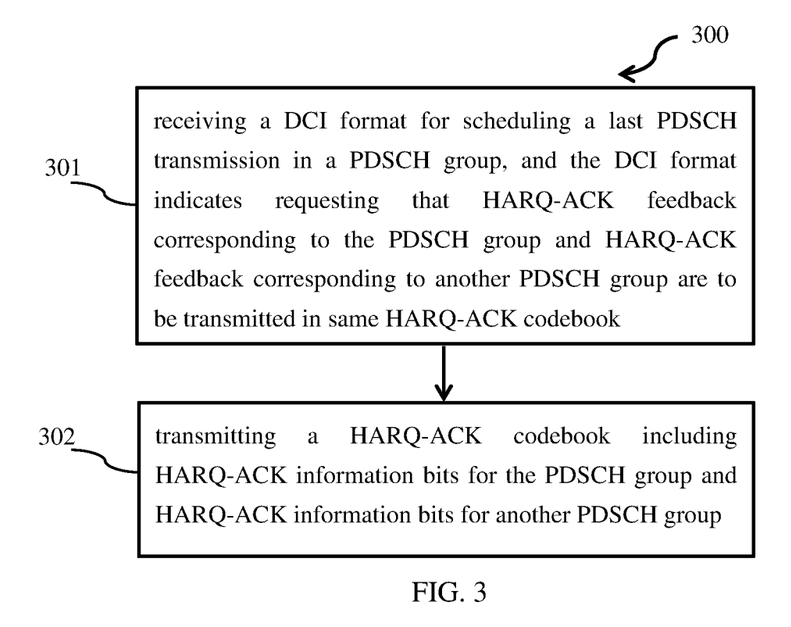
FIG. 3 illustrates an exemplary flow chart of a method for wireless communications in accordance with some embodiments of the present application.

FIG. 3 illustrates an exemplary flow chart of a method for wireless communications in accordance with some embodiments of the present application. The embodiments of FIG. 3 may be performed by a UE (e.g., UE 104 illustrated and shown in FIG. 1).

According to the exemplary method 300 as illustrated and shown in FIG. 3, in step 301, a UE receives a DCI format for scheduling a last PDSCH transmission in a PDSCH group (e.g., PDSCH group 0). The DCI format indicates requesting that HARQ-ACK feedback corresponding to the PDSCH group and HARQ-ACK feedback corresponding to another PDSCH group (e.g., PDSCH group 1) are to be transmitted in same HARQ-ACK codebook. For example, the DCI format includes an indicator for such requesting. The last PDSCH transmission in the PDSCH group is a PDSCH transmission which is latest received by the UE before transmission of the HARQ-ACK feedback corresponding to the PDSCH group.

In step 302, the UE transmits a HARQ-ACK codebook including HARQ-ACK information bits for the PDSCH group (e.g., PDSCH group 0) and HARQ-ACK information bits for another PDSCH group (e.g., PDSCH group 1). For instance, the HARQ-ACK codebook includes at least two parts, one part includes HARQ-ACK information bits for the PDSCH group, and the other part includes HARQ-ACK information bits for another PDSCH group.

Details related to the embodiments of FIG. 3 are described in the following paragraphs of the present application.

In some embodiments of the present application, in response to a size of the HARQ-ACK codebook transmitted in step 302 being smaller than 11 bits, the HARQ-ACK codebook further includes a third part. For example, the third part of the HARQ-ACK codebook is bit(s). The bit(s) may be generated based on a parity of a value of downlink assignment index (DAI) in the DCI format received in step 301. The bit(s) may be extra check bit(s) that is included in the HARQ-ACK codebook. The extra check bit(s) may indicate associated information of the latest received DCI (which may also be referred to as "a DCI format", as described above) from a UE's perspective. With the help of the check bit(s), a BS can determine whether the latest transmitted DCI is missed by the UE.

If the BS determines that the latest transmitted DCI is missed by the UE, the BS shall adjust the received HARQ-ACK codebook, so as to get the knowledge of HARQ-ACK feedback for both PDSCH group 0 and PDSCH group 1. In one example, the BS inserts, into the HARQ-ACK codebook, HARQ-ACK information bit(s) corresponding to a PDSCH transmission in PDSCH group 0, which is scheduled by the DCI missed by the UE. In another example, the BS identifies, in the HARQ-ACK codebook, a starting bit of HARQ-ACK information bit(s) corresponding to the PDSCH transmission(s) in PDSCH group 1.

In some embodiments of the present application, one parity check bit indicating a parity of a value of the latest received DAI in PDSCH group 0 is included at the beginning of the HARQ-ACK codebook. In these embodiments, at UE side, this DAI is the DAI indicated in the latest received DCI for scheduling the last PDSCH transmission in PDSCH group 0.

In these embodiments, at a BS side, upon reception of the HARQ-ACK codebook for both PDSCH group 0 and PDSCH group 1, if this parity check bit in the HARQ-ACK codebook is matched with the parity of the DAI in the latest transmitted DCI in PDSCH group 0 by the BS, the BS can determine that the latest transmitted DCI is not missed by the UE. Otherwise, if this parity check bit in the HARQ-ACK codebook is not matched with the parity of the DAI in the latest transmitted DCI in PDSCH group 0 by the BS, the BS can determine that the latest transmitted DCI is missed by the UE.

In some embodiments of the present application, if total DAI is included in the latest transmitted DCI in PDSCH group 0 by the BS, the parity check bit applies for the latest received total DAI, and the parity check bit indicates a parity of a value of the latest received total DAI. If total DAI is not included in the latest transmitted DCI in PDSCH group 0 by the BS, the parity check bit applies for the latest received counter DAI, and the parity check bit indicates a parity of a value of the latest received counter DAI.

In some embodiments of the present application, DAI in DCI has two bits. Two-bit DAI has four values, i.e., 1, 2, 3 and 4. For instance, at UE side, if the value of latest received DAI is an odd number, i.e., DAI=1 or DAI=3, bit "1" may be included as the one parity check bit in the final HARQ-ACK codebook for both PDSCH group 0 and PDSCH group 1. Alternatively, if the value of latest received DAI is an even number, i.e., DAI=2 or DAI=4, bit "0" may be included as the one parity check bit in the final HARQ-ACK codebook for both PDSCH group 0 and PDSCH group 1.

In some embodiments of the present application, at a BS side, when assuming the latest transmitted DAI is an odd-number, if the parity check bit in the final HARQ-ACK codebook is "1", the BS can determine that the latest transmitted DCI is not missed by the UE. Alternatively, if the parity check bit in the final HARQ-ACK codebook is "0", the BS can determine that the latest transmitted DCI is missed by the UE.

Similarly, at a BS side, when assuming the latest transmitted DAI is an even-number, if the parity check bit in the final HARQ-ACK codebook is "0", the BS can determine that the latest transmitted DCI is not missed by the UE. Alternatively, if the parity check bit in the final HARQ-ACK codebook is "1", the BS can determine that the latest transmitted DCI is missed by the UE.

Regarding the existence of parity check bit(s), the parity check bit(s) is included in the HARQ-ACK codebook as long as the total number of HARQ-ACK information bits for both PDSCH groups is equal or smaller than 10 bits. That is to say, the parity check bit is included in the HARQ-ACK codebook, if the total number of HARQ-ACK information bits for both PDSCH groups is equal or smaller than 10 bits.

The parity check bit is not included in the HARQ-ACK codebook, if the total number of HARQ-ACK information bits for both PDSCH groups is equal or larger than 11 bits. This is because the maximum number of HARQ-ACK information bits for RM coding procedure is 11 bits.

In some embodiments of the present application, parity check bit(s) for the latest received DAI is included at a beginning of the final HARQ-ACK codebook. Specific examples are described in the embodiments of FIGS. 4A, 4B, 4E, and 4F. In some other embodiments of the present application, parity check bit(s) for the latest received DAI is included at an end of the final HARQ-ACK codebook. There may be NACK bits between the last HARQ-ACK information bit and the parity check bit in the final HARQ-ACK codebook. Specific examples are described in the embodiments of FIGS. 4C and 4D.

Figure 4A:
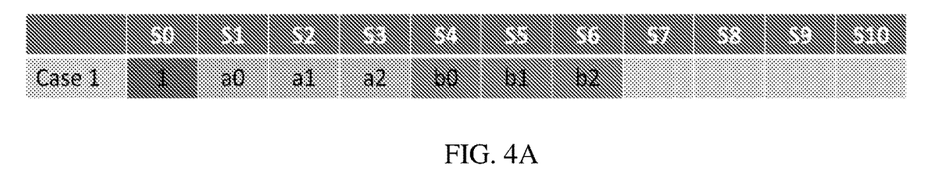
FIGS. 4A and 4B illustrate two exemplary HARQ-ACK codebook formats in accordance with some embodiments of the present application.
Figure 4B:
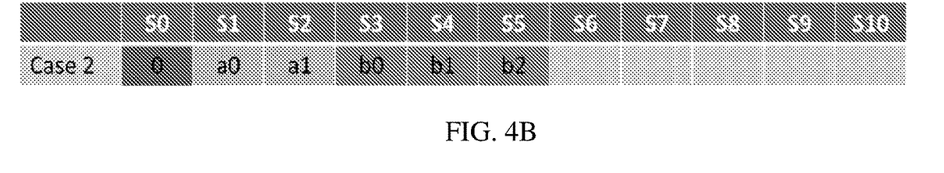

FIGS. 4A and 4B illustrate two exemplary HARQ-ACK codebook formats in accordance with some embodiments of the present application.

FIG. 4A shows an exemplary HARQ-ACK codebook format for Case 1 when the last DCI in slot 2 is not missed by the UE. FIG. 4B shows an exemplary HARQ-ACK codebook format for Case 2 when the last DCI in slot 2 is missed by the UE. The HARQ-ACK codebook formats in the embodiments of FIGS. 4A and 4B include 11 HARQ-ACK bits for both PDSCH group 0 and PDSCH group 1, i.e., S0 to S10 as shown in FIGS. 4A and 4B. With reference to the embodiments of FIGS. 2, a0, a1, and a2 in FIGS. 4A and 4B are HARQ-ACK bits for PDSCH transmissions in slots 0, 1, and 2 of PDSCH group 0, and b0, b1, and b2 in FIGS. 4A and 4B are HARQ-ACK bits for PDSCH transmissions of PDSCH group 1.

In particular, with reference to the embodiments of FIG. 2, the embodiments of FIG. 4A assume that the DCI for scheduling a PDSCH transmission in slot 2 is detected (i.e., not missed) by a UE (e.g., UE 104 illustrated and shown in FIG. 1), and the latest received DCI in PDSCH group 0 is DCI for scheduling a PDSCH transmission in slot 2. Since the value of the last DAI in the latest received DCI in slot 2 is "3" as shown in FIG. 2, which is an odd number, bit "1" is included in S0, as the parity check bit in the final HARQ-ACK codebook as shown in FIG. 4A, for Case 1, in which the last DCI in slot 2 is detected (i.e., not missed) by the UE.

With reference to the HARQ-ACK feedback codebook in the embodiments of FIG. 2, the embodiments of FIG. 4B assume that the DCI for scheduling a PDSCH transmission in slot 2 is missed by the UE and the DCI for scheduling a PDSCH transmission in slot 1 is detected, and the latest received DCI in PDSCH group 0 is DCI for scheduling the PDSCH transmission in slot 1. Since the value of the last DAI in slot 1 is "2" as shown in FIG. 2, which is an even number, bit "0" is included in S0, as the parity check bit in the final HARQ-ACK codebook as shown in FIG. 4B, for Case 2, in which the last DCI in slot 2 is missed by the UE. Moreover, since the last DCI in slot 2 is missed by the UE, a2 (i.e., HARQ-ACK bit for a PDSCH transmission in slot 2 in PDSCH group 0) is not transmitted in the final HARQ-ACK codebook as shown in FIG. 4B.

In the embodiments of FIGS. 4A and 4B, at BS side, since the latest transmitted DCI is DCI for scheduling a PDSCH transmission in slot 2, the value of the latest transmitted DAI is 3. Upon reception of the HARQ-ACK codebook from the UE, if the received parity check bit is "1", the BS determines that the last DCI in slot 2 is detected by the UE; otherwise, the BS determines that the last DCI in slot 2 is missed by the UE.

Figure 4C:
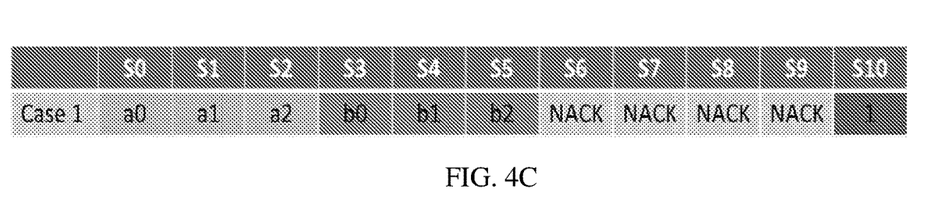
FIGS. 4C and 4D illustrate another two exemplary HARQ-ACK codebook formats in accordance with some embodiments of the present application.
Figure 4D:
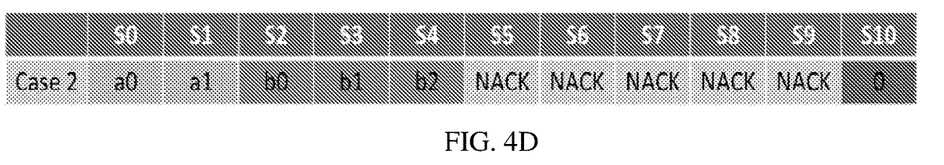

FIGS. 4C and 4D illustrate another two exemplary HARQ-ACK codebook formats in accordance with some embodiments of the present application. The exemplary HARQ-ACK codebook formats in the embodiments of FIGS. 4C and 4D are similar to those of the embodiments of FIGS. 4A and 4B, except different bit positions of the parity check bit in the HARQ-ACK codebook.

Specifically, the parity check bit for the latest received DAI is included at an end of the HARQ-ACK codebook in the embodiments of FIGS. 4C and 4D. There are NACK bits between the last HARQ-ACK information bit and the parity check bit in the final HARQ-ACK codebook.

As shown in FIG. 4C, since the value of the last DAI in the latest received DCI in slot 2 is "3" as shown in FIG. 2, which is an odd number, bit "1" is included in S10, as the parity check bit in the final HARQ-ACK codebook, for Case 1, in which the last DCI in slot 2 is detected (i.e., not missed) by the UE. The final HARQ-ACK codebook includes NACK bits in S6 to S9, i.e., between b2 in S5 (i.e., the last HARQ-ACK information bit) and the parity check bit in S10 of the final HARQ-ACK codebook.

As shown in FIG. 4D, since the value of the last DAI in slot 1 is "2" as shown in FIG. 2, which is an even number, bit "0" is included in S10, as the parity check bit in the final HARQ-ACK codebook, for Case 2, in which the last DCI in slot 2 is missed by the UE. Moreover, since the last DCI in slot 2 is missed by the UE, a2 (i.e., HARQ-ACK bit for a PDSCH transmission in slot 2 in PDSCH group 0) is not transmitted in the final HARQ-ACK codebook as shown in FIG. 4D. The final HARQ-ACK codebook includes NACK bits in S5 to S9, i.e., between b2 in S4 (i.e., the last HARQ-ACK information bit) and the parity check bit in S10 of the final HARQ-ACK codebook.

In some embodiments of the present application, two parity check bits are included in the final HARQ-ACK codebook, wherein one parity check bit indicates the parity of the value of the latest received DAI for PDSCH group 0, and another parity check bit indicates the parity of the value of the latest received DAI for PDSCH group 1.

In these embodiments, at UE side, this DAI is the DAI indicated in the latest received DCI for each PDSCH group. At BS side, upon reception of the HARQ-ACK codebook, the BS compares the parity check bit with a parity of a value of DAI in the DCI latest transmitted to the UE. Based on the comparison result, for a PDSCH group, if the parity check bit is matched with the parity of the DAI in the latest transmitted DCI by the BS, the BS determines that the latest transmitted DCI for the PDSCH group is not missed by the UE. Otherwise, the BS determines that the latest transmitted DCI for the PDSCH group is missed by the UE.

In some embodiments of the present application, if total DAI exists in the latest transmitted DCI in PDSCH group 0 and total DAI exists in the latest transmitted DCI in PDSCH group 1 by the BS, two parity check bits apply for the latest received total DAI for each PDSCH group, and each of the parity check bits indicates a parity of a value of the latest received total DAI for each PDSCH group. If total DAI does not exist in the latest transmitted DCI in PDSCH group 0 or PDSCH group 1 by the BS, the parity check bits apply for the latest received counter DAI for each PDSCH group, and each of the parity check bits indicates a parity of a value of the latest received counter DAI for each PDSCH group.

In some embodiments of the present application, two parity check bits in the final HARQ-ACK codebook can be ordered based on the increasing order or the decreasing order of group indexes of the PDSCH groups. These two parity check bits can be placed in two consecutive bit positions or non-consecutive bit positions in the final HARQ-ACK codebook.

In some embodiments of the present application, two parity check bits can be placed at a beginning or at an end of a HARQ-ACK codebook. If placed at the end of the HARQ-ACK codebook, there may be NACK bits between the last HARQ-ACK information bit and the first parity check bit. Alternatively, the two parity check bits can be placed at the beginning or the end of the HARQ-ACK information bits for respective PDSCH group. Specific examples are described in the embodiments of FIGS. 4E and 4F.

Regarding the existence of the parity check bit(s), two parity check bits are included in the HARQ-ACK codebook as long as the total number of HARQ-ACK information bits for both PDSCH groups is equal or smaller than 9 bits. That is to say, two parity check bits are included in the HARQ-ACK codebook, if the total number of HARQ-ACK information bits for both PDSCH groups is equal or smaller than 9 bits. A parity check bit for PDSCH group 0 is included in the HARQ-ACK codebook, but a parity check bit for PDSCH group 1 is not included in the HARQ-ACK codebook, if the total number of HARQ-ACK information bits for both PDSCH groups is equal to 10 bits. No parity check bit is included in the HARQ-ACK codebook, if the total number of HARQ-ACK information bits for both PDSCH groups is equal to 11 bits. This is because the maximum number of HARQ-ACK information bits for RM coding procedure is 11 bits.

Figure 4E:
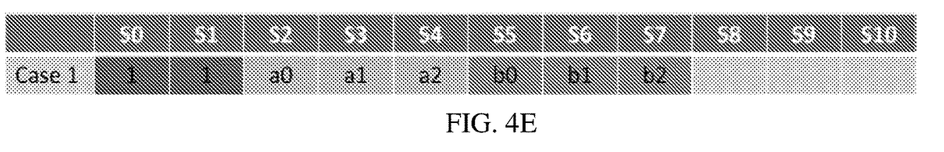
FIGS. 4E and 4F illustrate yet another two exemplary HARQ-ACK codebook formats in accordance with some embodiments of the present application.
Figure 4F:
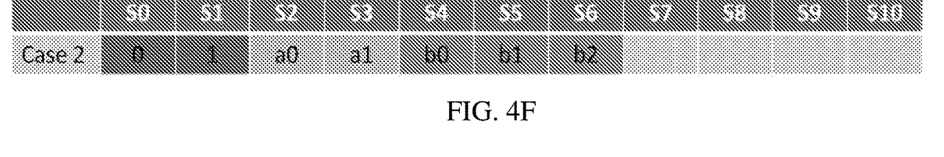

FIGS. 4E and 4F illustrate yet another two exemplary HARQ-ACK codebook formats in accordance with some embodiments of the present application. The exemplary HARQ-ACK codebook formats in the embodiments of FIGS. 4E and 4F are similar to those of the embodiments of FIGS. 4A and 4B, except that two parity check bits are applied for the embodiments of FIGS. 4E and 4F.

Specifically, with reference to the embodiments of FIG. 2, two parity check bits are placed at the beginning of the HARQ-ACK codebook as shown in FIGS. 4E and 4F. One parity check bit is placed at bit position S0 for indicating the parity of the value of the latest received DAI for PDSCH group 0, and the other parity check bit is placed at bit position S1 for indicating the parity of the value of the latest received DAI for PDSCH group 1.

For PDSCH group 0, the embodiments of FIG. 4E assume that the DCI for scheduling PDSCH in slot 2 is detected by a UE (e.g., UE 104 illustrated and shown in FIG. 1), the latest received DCI in PDSCH group 0 is DCI for scheduling a PDSCH transmission in slot 2. Since the value of the last DAI in the latest received DCI in slot 2 is "3" as shown in FIG. 2, which is an odd number, bit "1" is included in S0, as the parity check bit in the final HARQ-ACK codebook as shown in FIG. 4E, for Case 1, in which the last DCI in slot 2 is detected (i.e., not missed) by the UE.

For PDSCH group 1, the embodiments of FIG. 4E assume that there are three DCI formats scheduling three PDSCH transmissions in PDSCH group 1 and the last DCI in PDSCH group 1 is not missed. If the embodiments of FIG. 4E assume that the value of the last DAI in PDSCH group 1 is "3", which is an odd number, bit "1" is included in the final HARQ-ACK codebook as shown in FIG. 4E, for Case 1, in which the last DCI in PDSCH group 1 is detected (i.e., not missed) by the UE.

For PDSCH group 0, the embodiments of FIG. 4F assume that the DCI for scheduling a PDSCH transmission in slot 2 in PDSCH group 0 is missed by the UE and the DCI for scheduling a PDSCH transmission in slot 1 in PDSCH group 0 is detected, the latest received DCI is DCI for scheduling PDSCH in slot 1 in PDSCH group 0. Since the value of the last DAI is "2" as shown in FIG. 2, which is an even number, bit "0" is included in the final HARQ-ACK codebook as shown in FIG. 4F, for Case 2, in which the last DCI in slot 2 in PDSCH group 0 is missed by the UE. Moreover, since the last DCI in slot 2 in PDSCH group 0 is missed by the UE, a2 (i.e., HARQ-ACK bit for a PDSCH transmission in slot 2 in PDSCH group 0) is not transmitted in the final HARQ-ACK codebook as shown in FIG. 4F.

For PDSCH group 1, the embodiments of FIG. 4F assume that there are three DCI formats scheduling three PDSCH transmissions in PDSCH group 1 and the last DCI in PDSCH group 1 is not missed. If the embodiments of FIG. 4F assume that the value of the last DAI in PDSCH group 1 is "3", which is an odd number, bit "1" is included in the final HARQ-ACK codebook as shown in FIG. 4F, for Case 2, in which the last DCI in in PDSCH group 1 is missed by the UE.

In the embodiments of FIGS. 4E and 4F, at BS side, upon reception of the HARQ-ACK codebook from the UE, a BS shall compare the received parity check bit with a parity of a value of the last DAI for the corresponding PDSCH group, check, based on the comparison result, whether the received parity check bits for respective PDSCH group is matched with the parity of the value of the last DAI for the corresponding PDSCH group, and then determine whether the last DCI for the PDSCH group is missed or not.

In some embodiments of the present application, in addition to two parts which include HARQ-ACK information bits for two PDSCH groups, respectively, the final HARQ-ACK codebook further includes least significant bit (LSB) or most significant bit (MSB) of DAI in the latest received DCI. That is, a third part of the final HARQ-ACK codebook is LSB or MSB of the latest received DAI.

In an example, the LSB of the latest received DAI is included at the beginning of the HARQ-ACK codebook. In another example, the LSB of the latest received DAI is included at the end of the HARQ-ACK codebook. Similar to the embodiments of FIGS. 4C and 4D, there may be NACK bits between the last HARQ-ACK information bit (e.g., the last HARQ-ACK information bit corresponding to PDSCH group 1) and the LSB in the HARQ-ACK codebook.

In the abovementioned embodiments, at UE side, the latest received DAI is the DAI indicated in the latest received DCI. For instance, if total DAI exists in the DCI, a LSB of the latest received total DAI is included in the HARQ-ACK codebook. Otherwise, LSB of the latest received counter DAI is included in the HARQ-ACK codebook. At BS side, upon reception of the HARQ-ACK codebook, the BS compares the LSB in the HARQ-ACK codebook with the LSB of DAI of the DCI latest transmitted by the BS. Based on the comparision result, if the LSB in the HARQ-ACK codebook is same as the LSB of the latest transmitted DAI, the BS determines that the latest transmitted DCI is not missed by the UE. Otherwise, if the LSB in the HARQ-ACK codebook is different from the LSB of the latest transmitted DAI, the BS determines that the latest transmitted DCI is missed by the UE.

In some other embodiments of the present application, similar to the abovementioned embodiments regarding the LSB, the MSB of the latest received DAI can be included at the beginning or the end of the HARQ-ACK codebook.

Regarding the existence of the LSB or the MSB, the LSB or the MSB is included in the HARQ-ACK codebook as long as the total number of HARQ-ACK information bits for both PDSCH groups is equal or smaller than 10 bits. That is to say, the LSB or the MSB is included in the HARQ-ACK codebook, if the total number of HARQ-ACK information bits for both PDSCH groups is equal or smaller than 10 bits. The LSB or the MSB is not included in the HARQ-ACK codebook, if the total number of HARQ-ACK information bits for both PDSCH groups is equal or larger than 11 bits. This is because the maximum number of HARQ-ACK information bits for RM coding procedure is 11 bits.

Figure 5:
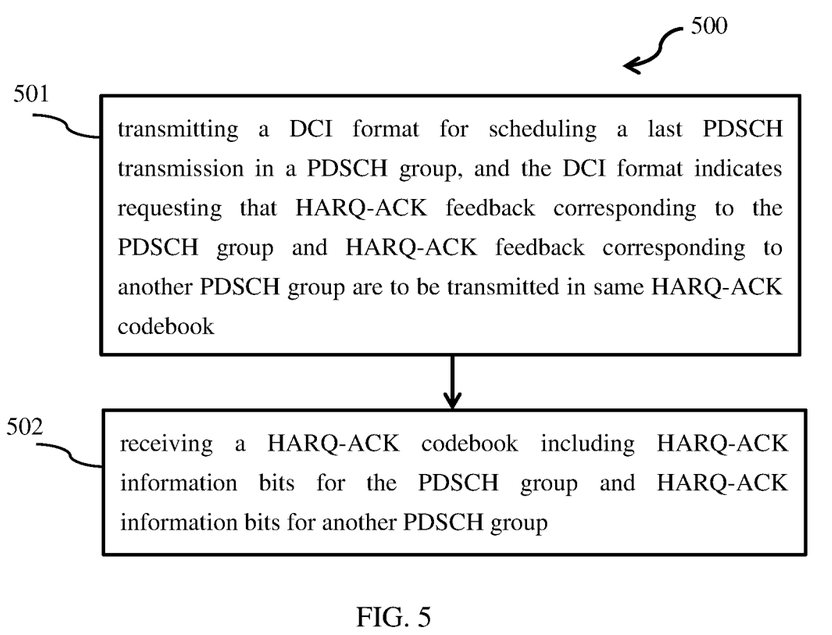
FIG. 5 illustrates a further exemplary flow chart of a method for wireless communication in accordance with some embodiments of the present application.

FIG. 5 illustrates a further exemplary flow chart of a method for wireless communication in accordance with some embodiments of the present application. The embodiments of FIG. 5 may be performed by a BS (e.g., BS 102 illustrated and shown in FIG. 1).

According to the exemplary method 500 as illustrated and shown in FIG. 5, in step 501, a BS transmits a DCI format for scheduling a last PDSCH transmission in a PDSCH group (e.g., PDSCH group 0). The DCI format indicates requesting that HARQ-ACK feedback corresponding to the PDSCH group and HARQ-ACK feedback corresponding to another PDSCH group (e.g., PDSCH group 1) are to be transmitted in same HARQ-ACK codebook. For example, the DCI format includes an indicator for such requesting. The last PDSCH transmission in the PDSCH group is a PDSCH transmission which is latest transmitted by the BS before reception of the HARQ-ACK feedback corresponding to the PDSCH group.

In step 502, the BS receives a HARQ-ACK codebook including HARQ-ACK information bits for the PDSCH group (e.g., PDSCH group 0) and HARQ-ACK information bits for another PDSCH group (e.g., PDSCH group 1). For instance, the HARQ-ACK codebook includes at least two parts, one part includes HARQ-ACK information bits for the PDSCH group, and the other part includes HARQ-ACK information bits for another PDSCH group.

Details described in the embodiments as illustrated and shown in FIG. 1-4F, especially, contents related to the different HARQ-ACK codebook formats for two PDSCH groups, are applicable for the embodiments as illustrated and shown in FIG. 5. Moreover, details described in the embodiments of FIG. 5 are applicable for all the other embodiments of drawings of the present application.

In some embodiments of the present application, the total bit positions for the final HARQ-ACK codebook are divided into two sets. One set of bits positions is reserved for HARQ-ACK information bits corresponding to PDSCH group 0, and the other set of bit positions is reserved for HARQ-ACK information bits corresponding to PDSCH group 1. The HARQ-ACK information bits for the two PDSCH groups are placed in the respective set of bit positions in the final HARQ-ACK codebook. For instance, for the bit positions in the final HARQ-ACK codebook where no ACK or NACK is mapped, NACK bit may be used as padding bit to reach 11 bits for RM coding procedure.

In an embodiment, in the final HARQ-ACK codebook, one set of bits positions includes even-numbered bit positions, and the other set of bits positions includes odd-numbered bit positions. In the final HARQ-ACK codebook, one set of bits positions can accommodate 6 HARQ-ACK information bits (i.e., bit positions of 0, 2, 4, 6, 8, 10), and the other set of bits positions can accommodate 5 HARQ-ACK information bits (i.e., bit positions of 1, 3, 5, 7, 9).

In one implementation of the embodiment, HARQ-ACK information bits for PDSCH group 0 are placed in the first set of bits positions, and HARQ-ACK information bits for PDSCH group 1 are placed in the second set of bits positions. Thus, there are maximum 6 HARQ-ACK information bits for PDSCH group 0, and there are maximum 5 HARQ-ACK information bits for PDSCH group 1.

In another implementation of the embodiment, HARQ-ACK information bits for PDSCH group 0 are placed in the second set of bits positions, and HARQ-ACK information bits for PDSCH group 1 are placed in the first set of bits positions. Thus, there are maximum 5 HARQ-ACK information bits for PDSCH group 0, and there are maximum 6 HARQ-ACK information bits for PDSCH group 1. Specific examples are described in the embodiments of FIGS. 6A and 6B.

In some embodiments of the present application, if the number of HARQ-ACK information bits for PDSCH group 0 is larger than 5 bits, or the number of HARQ-ACK information bits for PDSCH group 1 is larger than 6 bits, and the total number of HARQ-ACK information bits for both PDSCH groups is not larger than 11 bits, the remaining HARQ-ACK information bits for one PDSCH group can be placed in the remaining bit positions in the final HARQ-ACK codebook that are reserved for the other PDSCH group.

Figure 6A:
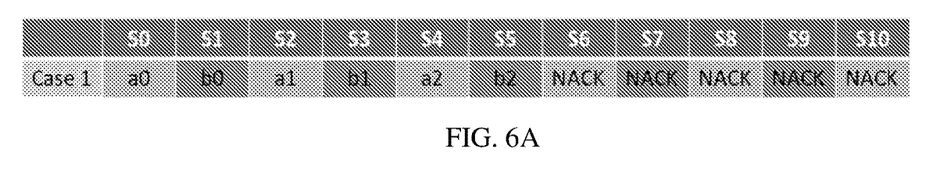
FIGS. 6A and 6B illustrate two exemplary HARQ-ACK codebook formats in accordance with some embodiments of the present application.
Figure 6B:
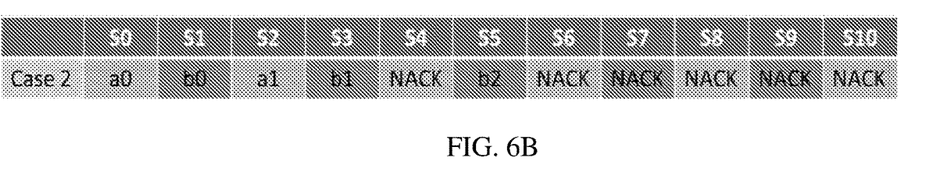

FIGS. 6A and 6B illustrate two exemplary HARQ-ACK codebook formats in accordance with some embodiments of the present application.

With reference to the embodiments of FIG. 2, the embodiments of FIG. 6A assume that DCI for scheduling a PDSCH transmission in slot 2 in PDSCH group 0 is detected by a UE (e.g., UE 104 illustrated and shown in FIG. 1). In the embodiments of FIG. 6A, the UE shall transmit the HARQ-ACK codebook, which includes a0, b0, a1, b1, a2, b2, NACK, NACK, NACK, NACK, and NACK in S0 to S10, respectively, to a BS (e.g., BS 102 illustrated and shown in FIG. 1) in slot 4. Wherein, a0, a1 and a2 are HARQ-ACK information bits for PDSCHs in slot 0, 1 and 2, and b0, b1 and b2 are assumed as retransmitted HARQ-ACK information bits for PDSCH group 1.

With reference to the embodiments of FIG. 2, the embodiments of FIG. 6B assume that the DCI for scheduling a PDSCH transmission in slot 2 in PDSCH group 0 is missed by the UE and the DCI for scheduling a PDSCH transmission in slot 1 is detected. In the embodiments of FIG. 6B, the UE will determine that a PDSCH transmission in slot 1 is the last received PDSCH transmission and generates NACK bits as padding bits for remaining bit positions in the first set of bit positions. As a result, the UE shall transmit the HARQ-ACK codebook, which includes a0, b0, a1, b1, NACK, b2, NACK, NACK, NACK, NACK, NACK, in S0 to S10, respectively, to the BS in slot 4. In the embodiments of FIG. 6B, even though the last DCI in slot 2 in PDSCH group 0 is missed by the UE, the corresponding HARQ-ACK bit for the missed PDSCH transmission is mapped to "NACK", and there is no HARQ-ACK bit shift for PDSCH group 1 in the final HARQ-ACK codebook.

In some embodiments of the present application, in the HARQ-ACK codebook, a first set of bit positions includes the first M bit positions of the HARQ-ACK codebook, and a second set of bit positions includes the remaining bit positions of the HARQ-ACK codebook. The first set of bit positions can accommodate M HARQ-ACK information bits, and the second set of bit positions can accommodate (11-M) HARQ-ACK information bits. M is an integer. The value of M can be configured by RRC signaling from a set of predefined values, e.g., a set of values of { 1, 2, 4, 6, 8, 10}. Alternatively, the value of M can be defined in a standard document from a set of values, e.g., {1, 2, 4, 6, 8, 10}.

In these embodiments, in Option 1, HARQ-ACK information bits for PDSCH group 0 are placed in the first set of bit positions, and HARQ-ACK information bits for PDSCH group 1 are placed in the second set of bit positions. There are maximum M HARQ-ACK information bits for PDSCH group 0, and the M HARQ-ACK information bits start from the beginning of the HARQ-ACK codebook. There are maximum (11-M) HARQ-ACK information bits for PDSCH group 1, and the (11-M) HARQ-ACK information bits start from the $(M+1)^{th}$ bit of the HARQ-ACK codebook. Specific examples are described in the embodiments of FIGS. 7A and 7B, in which the value of M is set to 6.

In Option 1, if the number of HARQ-ACK information bits for PDSCH group 0 is larger than M bits, or the number of HARQ-ACK information bits for PDSCH group 1 is larger than (11-M) bits, and the total number of HARQ-ACK information bits for both PDSCH groups is not larger than 11 bits, the remaining HARQ-ACK information bits for one PDSCH group can be placed in the remaining bit positions reserved for another PDSCH group.

In these embodiments, in Option 2, HARQ-ACK information bits for PDSCH group 1 are placed in the first set of bit positions, and HARQ-ACK information bits for PDSCH group 0 are placed in the second set of bit positions. There are maximum M HARQ-ACK information bits for PDSCH group 1 started from the beginning of the HARQ-ACK codebook. There are maximum (11-M) HARQ-ACK information bits for PDSCH group 0 started from the $(M+1)^{th}$ bit of the HARQ-ACK codebook. The examples for Option 2 are similar to the examples for Option 1 in FIGS. 7A and 7B.

In Option 2, if the number of HARQ-ACK information bits for PDSCH group 1 is larger than M bits, or the number of HARQ-ACK information bits for PDSCH group 0 is larger than (11-M) bits, and the total number of HARQ-ACK information bits for both PDSCH groups is not larger than 11 bits, the remaining HARQ-ACK information bits for one PDSCH group can be placed in the remaining bit positions reserved for another PDSCH group.

Figure 7A:
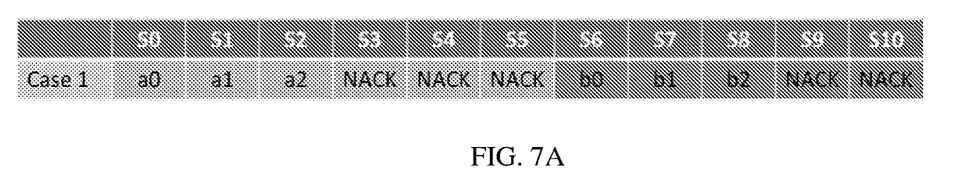
FIGS. 7A and 7B illustrate another two exemplary HARQ-ACK codebook formats in accordance with some embodiments of the present application.
Figure 7B:
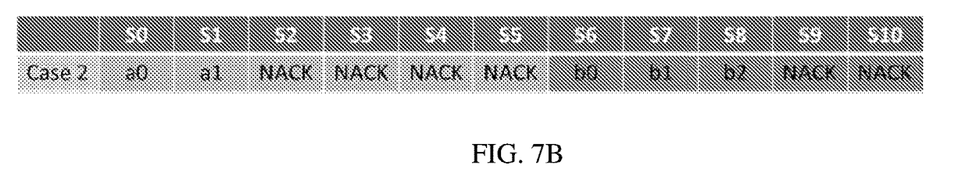

FIGS. 7A and 7B illustrate another two exemplary HARQ-ACK codebook formats in accordance with some embodiments of the present application. The embodiments of FIGS. 7A and 7B correspond to the abovementioned examples for Option 1.

In particular, in the embodiments of FIGS. 7A and 7B HARQ-ACK information bits for PDSCH group 0 are placed in the first set of bit positions of M bits, and HARQ-ACK information bits for PDSCH group 1 are placed in the second set of bit positions of (11-M) bits. In these embodiments, the value of M is set to 6. There are 6 HARQ-ACK information bits for PDSCH group 0 started from the beginning of the HARQ-ACK codebook, i.e., S0 to S5. There are 5 HARQ-ACK information bits for PDSCH group 1 started from the $(6+1)^{th}$ bit of the HARQ-ACK codebook, i.e., S6 to S10.

As can be seen, in Option 1, even though the DCI for scheduling a PDSCH transmission in slot 2 as shown in FIG. 2 is missed by the UE in accordance with the embodiments of FIG. 7B, the UE generates NACK for this PDSCH transmission. HARQ-ACK information bits for PDSCH group 1 started from the $7^{th}$ bit of the HARQ-ACK codebook, and thus there is no bit shift for PDSCH group 1 in the final HARQ-ACK codebook.

In some embodiments of the present application, assuming that the total-DAI for non-scheduled PDSCH group is included in the DCI scheduling a PDSCH transmission in another PDSCH group, the number of HARQ-ACK information bits for non-scheduled PDSCH group is exactly known to a UE based on the total-DAI.

According to these embodiments, when assuming that N HARQ-ACK information bits for non-scheduled PDSCH group are requested to be transmitted, if the non-scheduled PDSCH group is PDSCH group 1, N HARQ-ACK information bits for PDSCH group 1 may be placed in the last N bit positions of the HARQ-ACK codebook, and the HARQ-ACK information bits for PDSCH group 0 may be placed in the first (11-N) bit positions of the HARQ-ACK codebook; and if the non-scheduled group is PDSCH group 0, the N HARQ-ACK information bits for PDSCH group 0 may be placed in the first N bit positions of the HARQ-ACK codebook, and the HARQ-ACK information bits for PDSCH group 1 may be placed in the last (11-N) bit positions of the HARQ-ACK codebook.

Alternatively, HARQ-ACK information bits for PDSCH group 1 can be placed firstly in the HARQ-ACK codebook then concatenated with HARQ-ACK information bits for PDSCH group 0. For instance, NACK bit(s) may be used as padding bit(s), if there is remaining bit position(s) in the HARQ-ACK codebook. Specific examples are described in the embodiments of FIGS. 8A and 8B, in which the value of N is set to 3, which means that 3 HARQ-ACK bits for PDSCH group 1 are requested by DCI for scheduling a PDSCH transmission in PDSCH group 0.

Figure 8A:
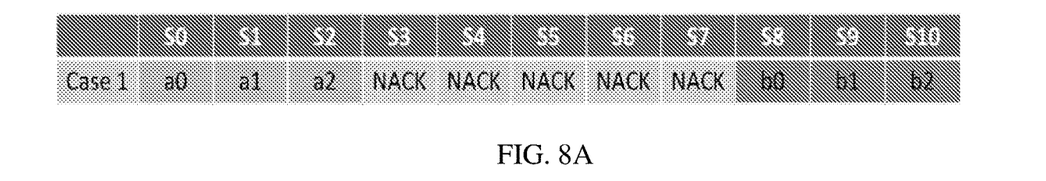
FIGS. 8A and 8B illustrate yet another two exemplary HARQ-ACK codebook format in accordance with some embodiments of the present application.
Figure 8B:
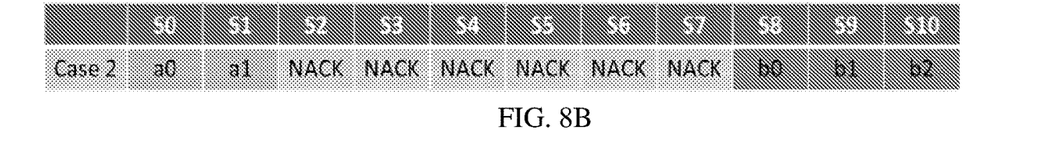

FIGS. 8A and 8B illustrate yet another two exemplary HARQ-ACK codebook format in accordance with some embodiments of the present application.

Specifically, in the embodiments of FIGS. 8A and 8B, the value of N is set to 3, and there are 3 HARQ-ACK bits for PDSCH group 1 that are requested by DCI for scheduling a PDSCH transmission in PDSCH group 0. As shown in FIGS. 8A and 8B, the 3 HARQ-ACK bits for PDSCH group 1 (i.e., b0, b1, and b2) are placed in the last 3 bit positions in the HARQ-ACK codebook (i.e., S8, S9, and S10), and the HARQ-ACK bits for PDSCH group 0 are placed in the remaining bit positions of the HARQ-ACK codebook.

As shown in FIG. 8A, the HARQ-ACK codebook is "a0, a1, a2, NACK, NACK, NACK, NACK, NACK, b0, b1, b2" in Case 1 that the DCI for scheduling a PDSCH transmission in slot 2 is detected by a UE (e.g., UE 104 illustrated and shown in FIG. 1). As shown in FIG. 8B, the HARQ-ACK codebook is "a0, a1, NACK, NACK, NACK, NACK, NACK, NACK, b0, b1, b2" in Case 2 that the DCI for scheduling a PDSCH transmission in slot 2 is missed by the UE while DCI for scheduling a PDSCH transmission in slot 1 is detected by the UE.

In the embodiments of FIGS. 8A and 8B, even though the DCI for scheduling a PDSCH transmission in slot 2 is missed by the UE, the UE generates NACK for this PDSCH transmission. HARQ-ACK information bits for PDSCH group 1 started from the $9^{th}$ bit of the HARQ-ACK codebook, so that there is no bit shift for PDSCH group 1.

In some embodiments of the present application, different PUCCH resources are indicated by both a PUCCH resource indicator (PRI) in the last DCI and a PRI in the penultimate DCI by a BS. Different HARQ-ACK codebooks with last DCI missed or not are detected by the BS in the corresponding PUCCH resource. The BS may detect the HARQ-ACK codebook with assumption that "the last DCI is detected by the UE" in the PUCCH resource indicated by the last DCI. The BS may detect the HARQ-ACK codebook with assumption that "the last DCI is missed by the UE" in the PUCCH resource indicated by the penultimate DCI if the BS doesn't detect the HARQ-ACK codebook in the PUCCH resource indicated by the last DCI.

If a PUCCH transmission is detected in the PUCCH resource indicated by the last DCI, the BS assumes that the received HARQ-ACK codebook is generated with assumption of the last DCI is not missed by the UE. If a PUCCH transmission is detected in the PUCCH resource indicated by the penultimate DCI, the BS assumes that the received HARQ-ACK codebook is generated with assumption of the last DCI is missed. In these embodiments, the BS can determine whether the HARQ-ACK information bits are shifted or not in the received HARQ-ACK codebook. From a UE's perspective, the UE expects that different PUCCH resources are indicated by the last DCI and the penultimate DCI. In this way, same understanding on HARQ-ACK codebook between the BS and the UE is guaranteed.

Specifically, in one embodiment, a BS transmits a DCI format for scheduling a PDSCH transmission in PDSCH group 0, and the DCI format indicates a first PUCCH resource for a UE to transmit a PUCCH transmission carrying a HARQ-ACK codebook. The BS transmits an additional DCI format for scheduling another PDSCH transmission in PDSCH group 0, and the additional DCI format indicates a second PUCCH resource for the UE to transmit the PUCCH transmission carrying the HARQ-ACK codebook. The PDSCH transmission scheduled by the DCI format in PDSCH group 0 is transmitted later than the abovementioned another PDSCH transmission scheduled by the additional DCI format.

After that, the BS may detect, on the first PUCCH resource, whether there is a PUCCH transmission carrying the HARQ-ACK codebook. In response to the PUCCH transmission carrying the HARQ-ACK codebook being not detected in the first PUCCH resource, the BS determines that the DCI format is missed by the UE. Then, the BS detects, on the second PUCCH resource, whether there is a PUCCH transmission carrying the HARQ-ACK codebook. In response to the PUCCH transmission being detected in the second PUCCH resource, the BS may adjust the HARQ-ACK codebook.

In one example, the BS may insert, into the HARQ-ACK codebook, HARQ-ACK information bit(s) corresponding to the PDSCH transmission in PDSCH group 0. In a further example, the BS may identify, in the HARQ-ACK codebook, a starting bit of HARQ-ACK information bit(s) corresponding to the PDSCH transmission(s) in PDSCH group 1.

Figure 9:
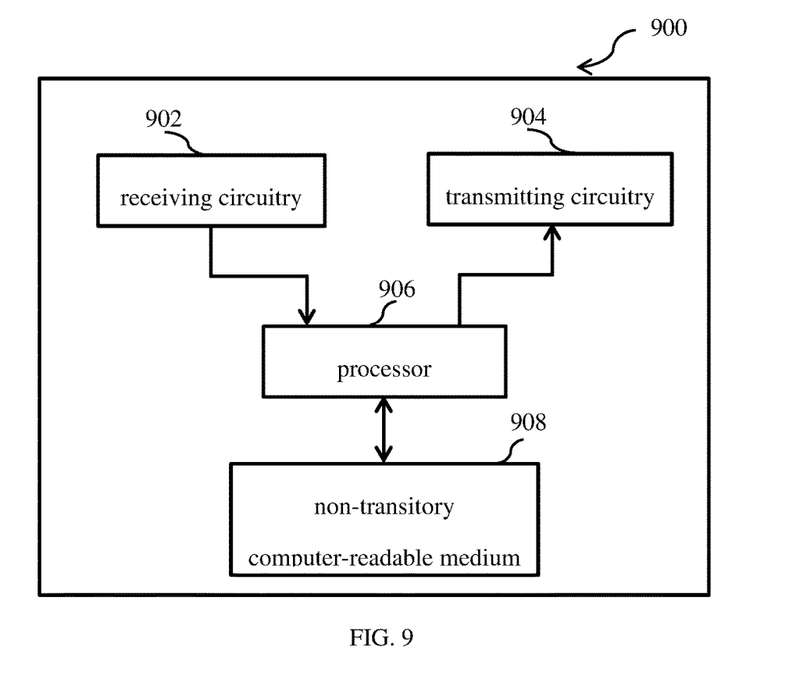
FIG. 9 illustrates a block diagram of an exemplary apparatus in accordance with some embodiments of the present application.

FIG. 9 illustrates a block diagram of an exemplary apparatus in accordance with some embodiments of the present application. Referring to FIG. 9, the apparatus 900 includes a receiving circuitry 902, a transmitting circuitry 904, a processor 906, and a non-transitory computer-readable medium 908. The processor 906 is coupled to the non-transitory computer-readable medium 908, the receiving circuitry 902, and the transmitting circuitry 904.

It is contemplated that some components are omitted in FIG. 9 for simplicity. In some embodiments, the receiving circuitry 902 and the transmitting circuitry 904 may be integrated into a single component (e.g., a transceiver).

In some embodiments, the non-transitory computer-readable medium 908 may have stored thereon computer-executable instructions to cause a processor to implement the operations with respect to UE(s) as described above. For example, upon execution of the computer-executable instructions stored in the non-transitory computer-readable medium 908, the receiving circuitry 902 and the transmitting circuitry 904 perform the method of FIG. 3, including: the receiving circuitry 902 receives a DCI format for scheduling a PDSCH transmission in a PDSCH group, wherein the DCI format includes an indicator for requesting that HARQ-ACK feedback corresponding to the PDSCH group and HARQ-ACK feedback corresponding to another PDSCH group are to be transmitted in same HARQ-ACK codebook, and the PDSCH transmission is a last PDSCH transmission in the PDSCH group received by the UE before transmission of the HARQ-ACK feedback corresponding to the PDSCH group; and the transmitting circuitry 904 transmits a HARQ-ACK codebook, wherein the HARQ-ACK codebook includes at least two parts, one part includes HARQ-ACK information bits for the PDSCH group, and the other part includes HARQ-ACK information bits for the abovementioned another PDSCH group.

In some embodiments, the non-transitory computer-readable medium 908 may have stored thereon computer-executable instructions to cause a processor to implement the operations with respect to BS(s) as described above. For example, upon execution of the computer-executable instructions stored in the non-transitory computer-readable medium 908, the receiving circuitry 902 and the transmitting circuitry 904 perform the method of FIG. 5, including: the transmitting circuitry 904 transmits to a UE, a DCI format for scheduling a PDSCH in a PDSCH group, wherein the DCI format includes an indicator for requesting that HARQ-ACK feedback corresponding to the PDSCH group and HARQ-ACK feedback corresponding to another PDSCH group are to be transmitted in same HARQ-ACK codebook, and the PDSCH transmission is a last PDSCH transmission in the PDSCH group transmitted by the BS before reception of the HARQ-ACK feedback corresponding to the PDSCH group; and the receiving circuitry 902 receives, from the UE, a HARQ-ACK codebook, wherein the HARQ-ACK codebook includes at least two parts, one part includes HARQ-ACK information bits for the PDSCH group, and the other part includes HARQ-ACK information bits for the above-mentioned another PDSCH group.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skills in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method for wireless communications performed by a user equipment (UE), comprising:
   receiving a first downlink control information (DCI) format for scheduling a physical downlink shared channel (PDSCH) transmission in a first PDSCH group, wherein the first DCI format includes an indicator for requesting that first hybrid automatic repeat request acknowledgement (HARQ-ACK) feedback corresponding to the first PDSCH group and second HARQ-ACK feedback corresponding to a second PDSCH group are to be transmitted in a same HARQ-ACK codebook; and
   transmitting a HARQ-ACK codebook, wherein the HARQ-ACK codebook includes a first part that comprises HARQ-ACK information bits for the first PDSCH group, a second part of that comprises HARQ-ACK information bits for the second PDSCH group, and a third part that comprises an indication of whether a second DCI format scheduling a last PDSCH transmission in the first PDSCH group was missed by the UE.

2. The method of claim 1, wherein in response to a size of the HARQ-ACK codebook being smaller than 11 bits, the HARQ-ACK codebook further includes the third part.

3. A user equipment (UE) for wireless communication, comprising:
   at least one memory; and
   at least one processor coupled with the at least one memory and configured to cause the UE to:
      receive a first downlink control information (DCI) format for scheduling a physical downlink shared channel (PDSCH) transmission in a first PDSCH group, wherein the first DCI format includes an indicator for requesting that first hybrid automatic repeat request acknowledgement (HARQ-ACK) feedback corresponding to the first PDSCH group and second HARQ-ACK feedback corresponding to a second PDSCH group are to be transmitted in a same HARQ-ACK codebook; and
      transmit a HARQ-ACK codebook, wherein the HARQ-ACK codebook includes a first part that comprises HARQ-ACK information bits for the first PDSCH group, a second part that comprises HARQ-ACK information bits for the second PDSCH group, and a third part that comprises an indication of whether a second DCI format scheduling a last PDSCH transmission in the first PDSCH group was missed by the UE.

4. The UE of claim 3, wherein in response to a size of the HARQ-ACK codebook being smaller than 11 bits, the HARQ-ACK codebook further includes the third part.

5. The UE of claim 3, wherein the third part of the HARQ-ACK codebook comprises a bit, and the bit is generated based on a parity of a value of downlink assignment index (DAI) in the second DCI format.

6. The UE of claim 3, wherein the third part of the HARQ-ACK codebook comprises a bit, and the bit is least significant bit (LSB) or most significant bit (MSB) of downlink assignment index (DAI) in the second DCI format.

7. The UE of claim 3, wherein the third part of the HARQ-ACK codebook comprises two bits, one of the two bits is generated based on a parity of a value of downlink assignment index (DAI) in the second DCI format, and another of the two bits is generated based on a parity of a value of DAI corresponding to a PDSCH transmission latest received in the second PDSCH group.

8. The UE of claim 7, wherein:
in response to the second DCI format including total DAI, the DAI is the total DAI; and
in response to the second DCI format not including the total DAI, the DAI is counter DAI.

9. The UE of claim 3, wherein the third part of the HARQ-ACK codebook is placed in a beginning of the HARQ-ACK codebook or an end of the HARQ-ACK codebook.

10. The UE of claim 3, wherein the first part of the HARQ-ACK codebook is placed in a first set of bit positions of the HARQ-ACK codebook, and the second part of the HARQ-ACK codebook is placed in a second set of bit positions of the HARQ-ACK codebook.

11. The UE of claim 10, wherein the first set of bit positions includes even-numbered bit positions in the HARQ-ACK codebook, and the second set of bit positions includes odd-numbered bit positions in the HARQ-ACK codebook.

12. The UE of claim 10, wherein:
the first set of bit positions includes first M consecutive bit positions or last M consecutive bit positions in the HARQ-ACK codebook, wherein M is an integer, and
the second set of bit positions includes remaining bit positions in the HARQ-ACK codebook.

13. The UE of claim 12, wherein a value of M is configured by radio resource control (RRC) signaling from a set of predefined values.

14. The UE of claim 10, wherein:
the second set of bit positions includes first N consecutive bit positions or last N consecutive bit positions in the HARQ-ACK codebook, wherein N is an integer, and
the first set of bit positions includes remaining bit positions in the HARQ-ACK codebook.

15. The UE of claim 14, wherein a value of N is determined based on total downlink assignment index (DAI) of the second PDSCH group, and the total DAI of the second PDSCH group is included in the second DCI format.

16. The UE of claim 10, wherein the first set of bit positions are consecutive bit positions in the HARQ-ACK codebook, and the second set of bit positions are consecutive bit positions in the HARQ-ACK codebook.

17. The UE of claim 16, wherein the first set of bit positions is immediately preceding the second set of bit positions in the HARQ-ACK codebook.

18. The UE of claim 17, wherein the HARQ-ACK codebook is transmitted in a physical uplink control channel (PUCCH) resource, and the PUCCH resource is indicated by the first DCI format.

19. A network equipment for wireless communication, comprising:
at least one memory; and
at least one processor coupled with the at least one memory and configured to cause the network equipment to:
transmit, to a user equipment (UE), a first downlink control information (DCI) format for scheduling a physical downlink shared channel (PDSCH) transmission in a first PDSCH group, wherein the first DCI format includes an indicator for requesting that first hybrid automatic repeat request acknowledgement (HARQ-ACK) feedback corresponding to the first PDSCH group and second HARQ-ACK feedback corresponding to a second PDSCH group are to be transmitted in a same HARQ-ACK codebook; and
receive, from the UE, a HARQ-ACK codebook, wherein the HARQ-ACK codebook includes a first part that comprises HARQ-ACK information bits for the first PDSCH group, a second part that comprises HARQ-ACK information bits for the second PDSCH group, and a third part that comprises an indication of whether a second DCI format scheduling a last PDSCH transmission in the first PDSCH group was missed by the UE.

20. A method for wireless communications performed by a network equipment, comprising:
transmitting, to a user equipment (UE), a first downlink control information (DCI) format for scheduling a physical downlink shared channel (PDSCH) transmission in a first PDSCH group, wherein the first DCI format includes an indicator for requesting that first hybrid automatic repeat request acknowledgement (HARQ-ACK) feedback corresponding to the first PDSCH group and second HARQ-ACK feedback corresponding to a second PDSCH group are to be transmitted in a same HARQ-ACK codebook; and
receiving, from the UE, a HARQ-ACK codebook, wherein the HARQ-ACK codebook includes a first part that comprises HARQ-ACK information bits for the first PDSCH group, a second part that comprises HARQ-ACK information bits for the second PDSCH group, and a third part that comprises an indication of whether a second DCI format scheduling a last PDSCH transmission in the first PDSCH group was missed by the UE.

* * * * *